G. R. BAKER.
APPARATUS FOR TREATMENT OF DOUGH.
APPLICATION FILED FEB. 14, 1917.
1,270,096.
Patented June 18, 1918.
3 SHEETS—SHEET 1.
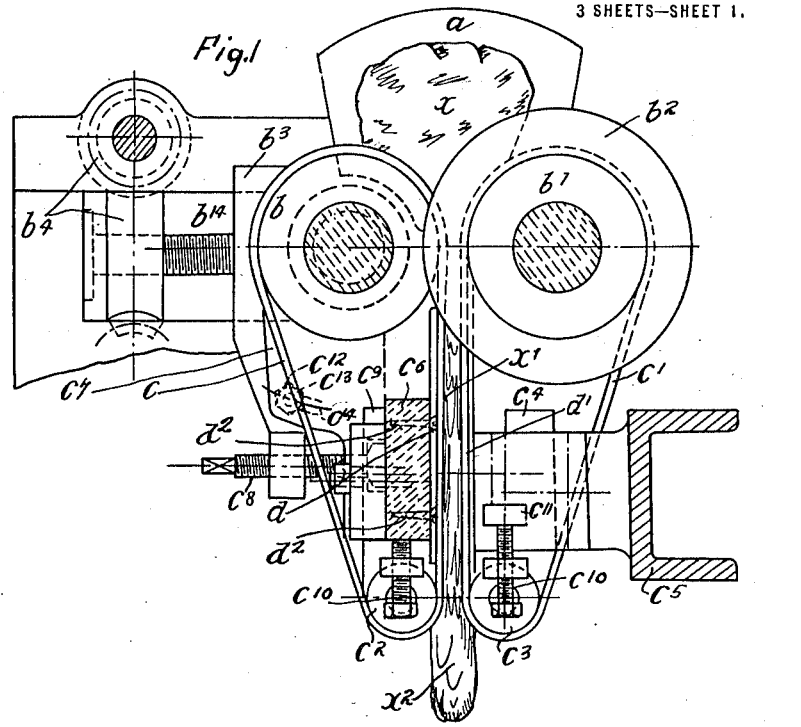
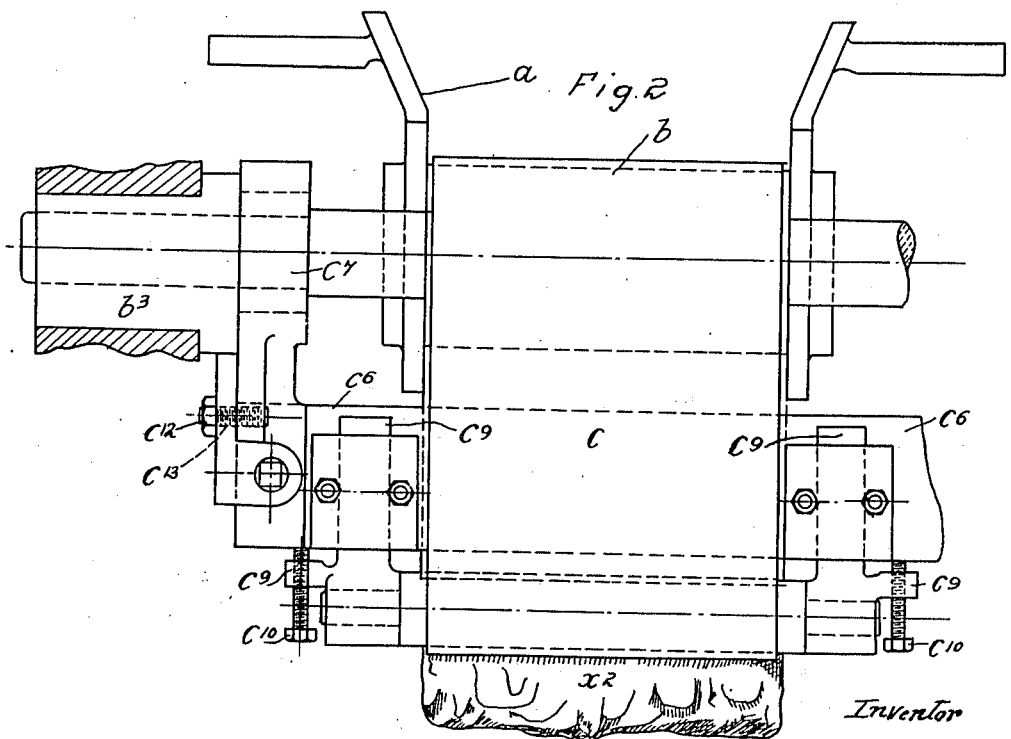

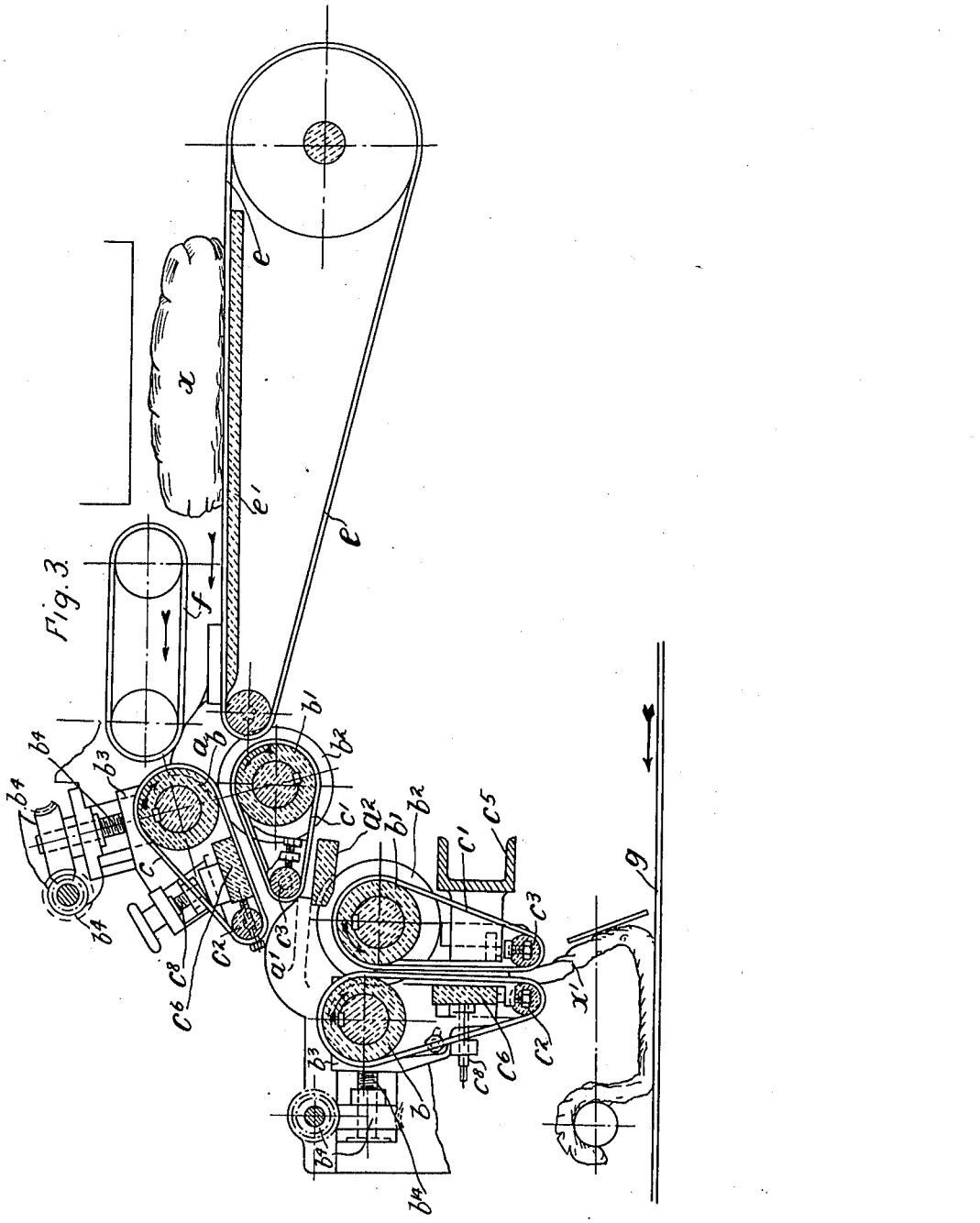

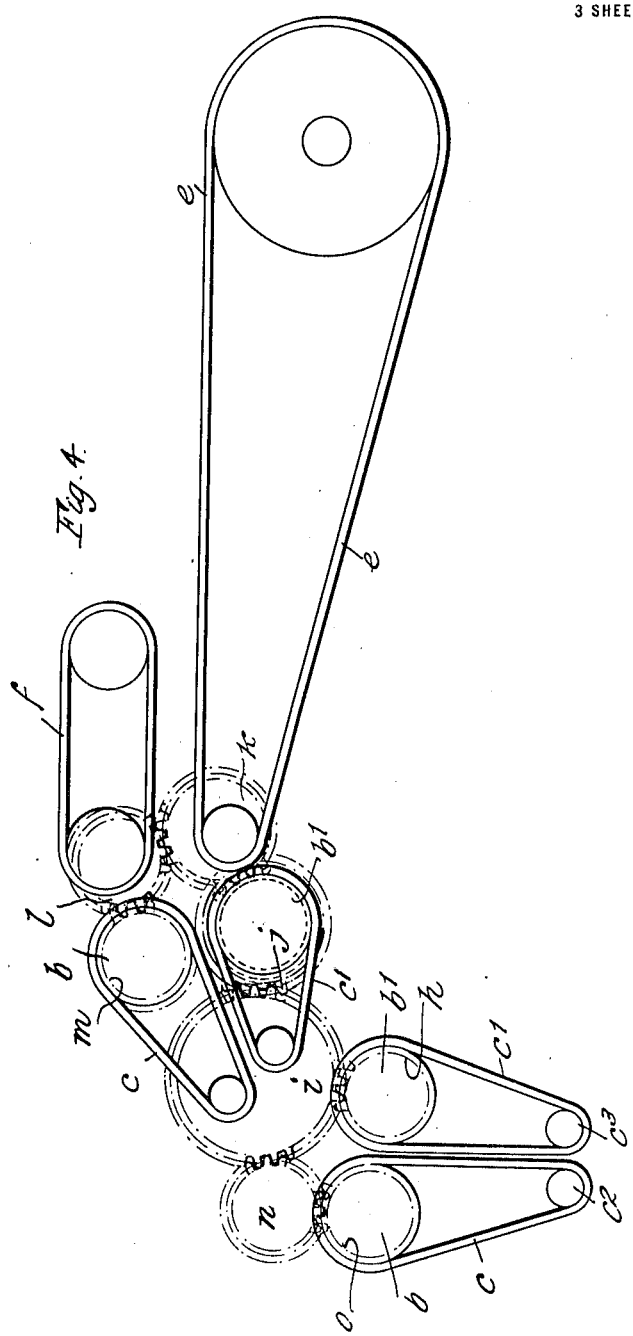

UNITED STATES PATENT OFFICE.

GEORGE RALPH BAKER, OF LONDON, ENGLAND.

APPARATUS FOR TREATMENT OF DOUGH.

1,270,096.  Specification of Letters Patent.  Patented June 18, 1918.

Application filed February 14, 1917.  Serial No. 148,562.

*To all whom it may concern:*

Be it known that I, GEORGE RALPH BAKER, residing at London, in England, have invented certain new and useful Improvements in Apparatus for the Treatment of Dough, of which the following is a specification.

This invention relates to the treatment of dough such as for breadmaking and comprises a novel apparatus for sheeting and stretching the dough as part of the molding operation, more particularly in the production of what are known as "Scotch" loaves, although not necessarily restricted to this class of loaf.

In the class of molding referred to, it is required to produce a relatively long narrow sheet of dough and it has been previously proposed to sheet or stretch such dough by the passage thereof between coacting pairs of rollers and endless traveling webs or belts arranged either parallel or converging, said webs being held in position by pressure plates or boards to produce a pressure on the dough during its passage between them, but this pressure has the effect of sheeting or flattening the dough equally in all directions and is not entirely suitable for producing the long narrow sheet required.

The present invention, consists in effecting the stretching or sheeting of the dough by passing same between one or more pairs of traveling bands or endless webs the active surfaces or runs of which are substantially parallel and which at the intake end pass about oppositely disposed rollers of suitable diameter, one of said rollers being essentially provided with lateral flanges to definitely control the width which the sheet of dough may attain. There may be provided known forms of rigid supports for the webs to prevent their separation due to flexibility thereof when the dough passes between them, or one support only need be used in which case the whole pressure on the dough after it has passed the rollers is due to the tension of the unsupported web. The dough is passed into the rollers between guide hoppers and is gaged or sheeted by the roller or rollers at the intake position where its width is determined by the roller flanges and the action of the webs on the dough subsequent to the gaging is to approximately maintain the dough in the stretched state to which it is brought at the narrowest point between the rollers for a sufficient time to allow the sheet to become permanently stretched to maintain its relatively long narrow form and a certain amount of flexibility between the webs (as where the rigid support of one web is removed) may be found desirable to produce this result.

Where more than one gaging or sheeting element or set thereof is employed, the delivery end of one of same may be in close proximity to the intake position of the following one, and this latter may run at a higher speed than the first so that there will be a stretching action on the dough sheet between the said two members, whereby the gaging rollers will be relieved of some of their duty. The gaging and also the stretching action between the gaging members may be repeated as often as desirable to produce a sheet of the desired dimensions, since by a series of small stretching operations the dough is brought into the required shape with the application of less pressure and force, and there is less tendency of destroying the "life" of the dough.

Apparatus for carrying out the method above referred to are represented in the accompanying drawings in which:—

Figure 1 is a side elevation with parts in section showing a pair of gaging rollers and coöperating sheeting bands and appurtenant parts;

Fig. 2 is an end elevation of Fig. 1 and

Fig. 3 is a side elevation with parts in section showing in combination two sets of sheeting bands and rollers adapted to be driven at increasing speeds and showing also a horizontal feed band and vertical delivery of the dough sheet to a folding or coiling mechanism.

Fig. 4 is a diagram showing means for driving the stretching band and rollers at different relative speeds.

To refer more specifically to Figs. 1 and 2 of the drawings, $a$ designates a hopper into which the piece of dough $x$ may be fed by any appropriate means and partly extending into the lower part of said hopper is a pair of coöperating gaging rollers $b$ $b^1$ the latter of which is shown as provided at its ends with flanges $b^2$ overlapping to some extent the ends of the other roller $b$ to limit or control the width of the subsequent sheet. The roller $b^1$ may be mounted in any suitable fixed bearings (not shown) but the roller $b$ is shown as mounted in sliding bearing blocks $b^3$ capable of adjustment as by means of worm gearing $b^4$ and screw $b^{14}$.

Passing about each of said rollers $b$ $b^1$ is an endless sheeting band $c$ $c^1$ respectively suitably made of thick flannel or other appropriate resilient or textile material the portions of said band remote from the rollers passing about other smaller rollers $c^2$ $c^3$, which may be termed delivery rollers. The delivery roller $c^3$ has bearing in bars $c^4$ mounted to slide in a support $c^5$ on the machine frame but the other delivery roller $c^2$ has bearing in bars $c^9$ supported by a cross bar $c^6$ mounted on a pair of arms $c^7$ (one only of which is shown) which is trunnioned on the adjustable bearing blocks $b^3$, said bar $c^6$ being capable of adjustment as by means of a screw $c^8$ so that the position of the said delivery roller $c^2$ may be varied in order that the bands $c$ $c^1$ may be set either parallel or slightly closer to one another at the delivery end thus putting greater pressure on the dough and permitting of driving out more gas therefrom. The degree of adjustment given said delivery roller $c^2$ is determined by the nature of the dough and the amount of "work" or pressure required to be put into it. For the lightest action on the dough the bands are set parallel to one another but on the other hand a closer texture is given to the resultant loaf if the delivery rolls are set slightly closer together as by screws $d^2$. When the desired adjustment of the delivery roll has been made the arm $c^7$ may be held in adjusted position by screwing up a nut $c^{12}$ on a stud $c^{13}$ extending from the arm $c^7$ and passing through a curved slot $c^{14}$ into a projecting part of the bearing block $b^3$. The bearings for each of the bands $c$ $c^1$ are provided with means such as set-screw $c^{10}$ for tightening said bands these screws being adapted to bear against the bar $c^6$ and a stud $c^{11}$ respectively for this purpose.

From the above description it will be seen that by means of the worm gearing $b^4$ the distance between the sheeting bands as a whole may be adjusted to vary the thickness of the resultant sheet and that by means of the adjusting screw $c^8$ the distance between the delivery rolls may be varied for the purpose previously stated and it may be here mentioned that as it leaves the delivery rollers the sheet of dough $x^1$ contracts in length at $x^2$ somewhat as shown in Fig. 1.

In addition to the features above described one or both of the sheeting bands $c$, $c^1$ may be provided to the rear of its active surface with a plate or support $d$, $d^1$ respectively, the plate $d^1$ being carried by the support $c^5$ and being extended for use also as a scraper for the flanges or edges of the gaging roller $b^1$ at which places the dough would otherwise accumulate and work in around the edges of the sheeting band $c^1$. The other plate or support $d$ is detachably carried by the cross bar $c^6$ and if desired may be dispensed with to render the sheeting band $c$ more flexible, the tension on the band being sufficient to hold and stretch the sheet of dough.

To now refer more specifically to Fig. 3 there is here shown two sets of sheeting bands and gaging rollers, the second of which may be driven at a ratio of $\frac{4}{3}$ to the surface speed of the first set. The same reference characters as in Figs. 1 and 2 are here used to designate corresponding parts to those already described. It will also be seen that the sets are arranged in angular relation and that a second hopper $a^1$ is interposed between the delivery rollers of the first set and the gaging rollers of the second set, this hopper being carried by a cross-bar $a^2$ carried by the machine frame. For driving the second set of stretching band engaging rollers at an increased speed mentioned above mechanism as shown in Fig. 4 may be adopted. In this figure the roller $b^1$ of the said second or lower set may be regarded as the driving element and carries a gear $h$ meshing with a large idle gear $i$, which in turn meshes with a gear $j$ carried by the roller $b^1$ of the first or upper set the ratio of gearing being such as to drive the second roller $b^1$ considerably faster than the first. The said gear $j$ provides a pair of idler gears $k$ and $l$, the latter of which meshes with a gear $m$ carried by the upper roller $b$ and a large idler $i$ provides another gear $n$ which meshes with the gear $o$ on the lower roller $b^1$.

It will also be seen from this figure that there is combined with the gaging and sheeting apparatus a feed device to the first hopper $a$ which comprises a feed band $e$ shown as passing over a table $e^1$ and on to which the piece of dough $x$ may be delivered in a substantially cylindrical shape by any appropriate means such as a known type of vertical web and board forming a coöperating trough. The said feed band $e$ may be driven continuously or intermittently and in the case under consideration the latter would be the case in order to time the feed to the folding mechanism hereinafter mentioned. Above the discharge end of the band $e$ is a relatively short endless web $f$ between which and the band $e$ the cylindrically shaped piece of dough is passed to effect a preliminary stretching thereof and by means of which it is guided into the hopper $a$. The web $f$ is driven at the same surface speed as the feed band $e$ and may be driven by suitable gearing therefrom (not shown) or in any other convenient manner.

The first pair of stretching bands is driven at a slightly faster speed than the feed band $e$ and coacting preliminary web $f$ and following pairs of stretching bands are driven at a slightly faster speed than the first or that immediately preceding, the webs being of such length and otherwise so arranged that the dough is always acted on at the same time by at least two of said pairs of bands, the intake ends of which in each case pass about the gaging rollers.

All the pairs of stretching bands may be located in the same plane, either horizontal, inclined or vertical, or may be disposed in angular relation according to the type of apparatus used, space at disposal or other circumstances, and as an example of the relative speeds at which they may be driven I may mention that with three pairs of webs the last would be driven at about double the speed of the first with the intermediate web at a proportionate rate.

Fig. 3 also shows the sheet of dough issuing from the second pair of sheeting bands and being delivered on to a conveyer $g$ on which it may be folded as by any known form of mechanism or coiled or otherwise dealt with by any appropriate means.

What I claim as my invention and desire to secure by Letters Patent of the United States is:—

1. In apparatus for the treatment of dough, the combination of a pair of adjacently positioned traveling stretching bands or webs between which the dough is passed to produce a sheet and a pair of gaging rollers at the intake ends of said bands about which the bands pass, one of said rollers of a pair being provided with means to positively control the width which the sheet of dough may attain.

2. In apparatus for the treatment of dough, the combination of a pair of adjacently positioned traveling stretching bands or webs having their active runs substantially parallel and between which runs the dough is passed to produce a sheet, and an oppositely positioned pair of gaging rollers at the intake ends of said bands and about which they pass, one of said rollers of a pair being provided with lateral flanges to positively control the width which the sheet of dough may attain.

3. In apparatus for the treatment of dough, the combination of a pair of adjacently positioned traveling endless stretching bands or webs between which the dough is passed to produce a sheet, a gaging roller at the intake end of each band about which it passes, means on one of said rollers for positively controlling the width which the sheet of dough may attain, means for relatively adjusting the bands and gaging rollers as a whole and means for adjusting the delivery ends of said bands independently of the first mentioned adjustment.

4. In apparatus for the treatment of dough, the combination of a pair of adjacently positioned traveling stretching bands or webs between which the dough is passed to form a sheet, a gaging roller at the intake end of each band about which it passes, means on one of said rollers for positively controlling the width which the sheet may attain while passing through the rollers, a detachable support for the sheeting surface of one stretching band of a pair and a permanent support for the sheeting surface of the other band.

5. In apparatus for the treatment of dough the combination of a pair of adjacently positioned traveling endless stretching bands or webs having their adjacent runs substantially parallel and between which runs the dough is passed to form a sheet, oppositely positioned gaging rollers at the intake ends of said bands and about which the latter pass, lateral flanges on one of said rollers for positively limiting the width which the sheet of dough may attain, a detachable support for the sheeting surface of one stretching band of a pair, a permanent support for the sheeting surface of the other band, means for relatively adjusting the bands and gaging rollers as a whole and means for adjusting the delivery ends of said bands independently of the first mentioned adjustment.

6. In apparatus for the treatment of dough, the combination of a plurality of pairs of adjacently positioned traveling endless bands or webs arranged in tandem formation and driven at successively increasing speeds, between which bands the dough is passed to produce a sheet, a gaging roller at the intake end of each band and about which said bands pass, and means on one of the rollers of each pair of bands for positively controlling the width which the sheet of dough may attain.

7. In apparatus for the treatment of dough, the combination of a plurality of pairs of adjacently positioned traveling endless bands or webs between which the dough is passed to produce a sheet, a gaging roller at the intake end of each band about which the latter passes and lateral flanges on one of said rollers for positively controlling the width the sheet of dough may attain, the pairs of rollers and bands being driven at successively increasing speeds and being so relatively located that the sheet of dough is acted on by at least two of said pairs of bands and rollers and means for driving the rollers.

8. In apparatus for the treatment of dough the combination of a plurality of pairs of adjacently positioned traveling endless bands or webs between which the dough is passed to produce a sheet, a gaging roller at the intake end of each band about which the latter passes, lateral flanges on one of said rollers for positively controlling the width the sheet of dough may attain, the pairs of rollers and bands being driven at succesively increasing speeds and being so relatively located that the sheet of dough is acted on by at least two of said pairs of bands and rollers, means for driving said rollers, supports for the sheeting surfaces of said bands and means for relatively adjusting the bands of each pair.

In witness whereof I have signed this specification in the presence of two witnesses.

GEORGE RALPH BAKER.

Witnesses:
GEO. VAN DYNE,
H. S. BURSLEY.